Nov. 1, 1955 R. McDONALD 2,722,598

AUTOMATIC RADIO TELEPHONE SYSTEM

Filed Feb. 1, 1950 3 Sheets-Sheet 1

INVENTOR.
RAMSAY McDONALD
BY
Darby + Darby

Nov. 1, 1955 R. McDONALD 2,722,598

AUTOMATIC RADIO TELEPHONE SYSTEM

Filed Feb. 1, 1950 3 Sheets-Sheet 2

INVENTOR
RAMSAY McDONALD
BY
Darby + Darby
ATTORNEYS

Nov. 1, 1955 R. McDONALD 2,722,598

AUTOMATIC RADIO TELEPHONE SYSTEM

Filed Feb. 1, 1950 3 Sheets-Sheet 3

RAMSAY McDONALD

BY Darby + Darby
ATTORNEYS

United States Patent Office 2,722,598

Patented Nov. 1, 1955

2,722,598

AUTOMATIC RADIO TELEPHONE SYSTEM

Ramsey McDonald, Richmond, Ind.

Application February 1, 1950, Serial No. 141,659

16 Claims. (Cl. 250—6)

Figure 1:
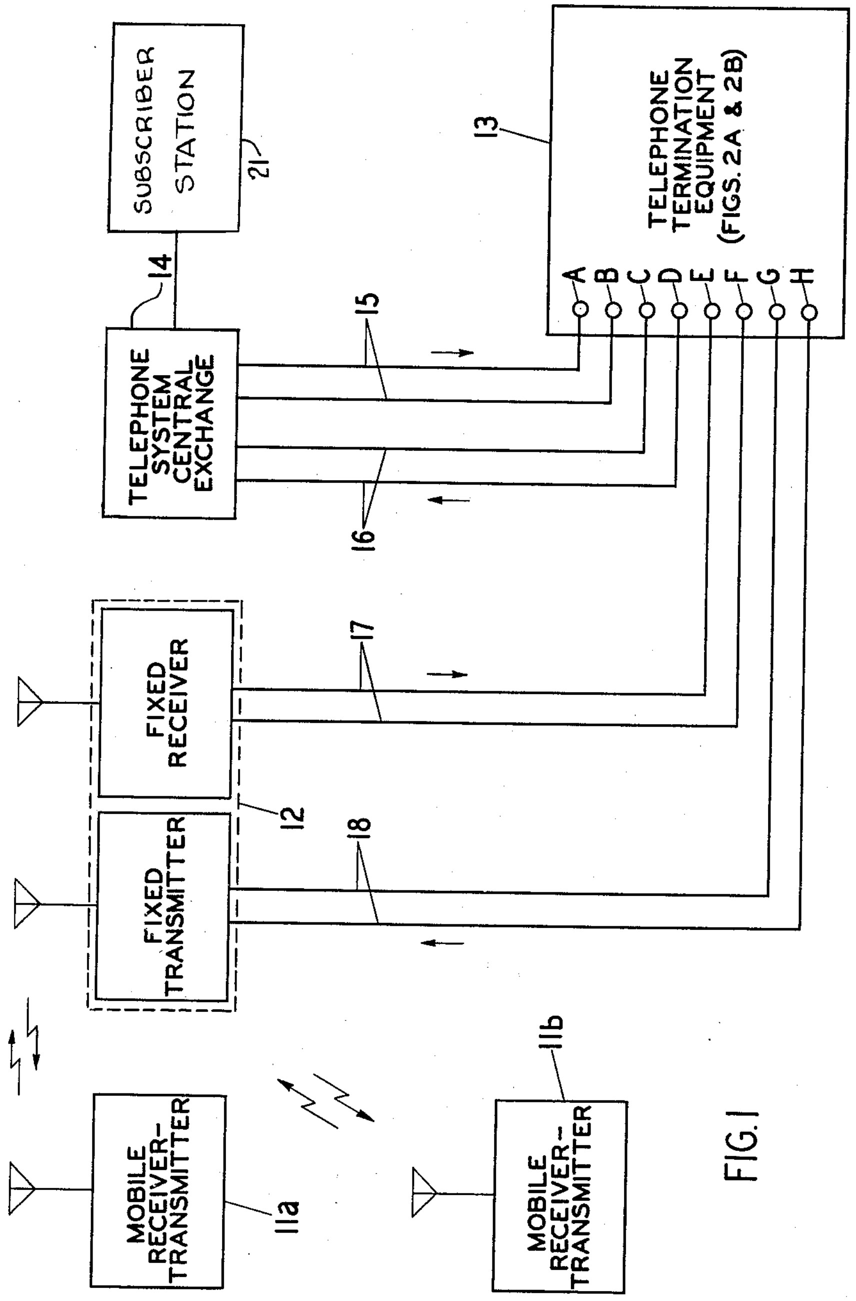

The present invention is directed to the art including automatic radio telephone systems and particularly concerns automatic non-attended two-way dial-operated radio telephone systems especially adapted for mobile communication.

At the present time there is serious need of a practical fully automatic radio telephone system, fully dial-operated, which can perform satisfactorily without requiring the attendance of operators. This is especially the case in connection with mobile systems such as fleets of automobiles or of ships where it is desirable to have any mobile unit easily call any fixed subscriber or station. In particular, it is useful to be able to have any subscriber associated with a telephone company central exchange call or receive calls from any one of a fleet of mobile units.

Such a system is provided by the present invention which concerns particular equipment which can be connected to any standard dial telephone exchange merely by the use of two telephone pairs serving as the incoming and outgoing radio trunks. The equipment is relatively simple and enables any subscriber in the central telephone exchange to dial directly to any mobile unit in the system. Similarly, any such mobile unit may directly dial any subscriber in the exchange. Long distance calls to or from the mobile unit can similarly be made, by use of the telephone company long distance trunks.

According to the present system each mobile unit is provided with a two-way simplex radio installation of the press-to-talk type. At a fixed station there is located a central radio transmitter and receiver which serves up to 84 mobile units with the use of the same dial tone, or more, with the use of further dial tones, as will be described. This fixed station transmitter and receiver are coupled to the two trunks leading to the telephone central office or exchange by apparatus termed the "termination equipment," which forms an important part of the present invention.

In operation, a fixed station subscriber dials a number which connects him through the telephone central exchange to the radio "trunk" defined by the termination equipment and the fixed transmitter and receiver. The subscriber then hears radio dial tone, and proceeds to dial the particular number assigned to the mobile unit he desires to call, which is then automatically called and upon its responding full two-way communication occurs. In the reverse direction, the mobile unit dials zero (10 pulses) which is received by the fixed station radio receiver and termination equipment, which provides connection to the telephone central exchange. When the mobile subscriber hears the telephone company dial tone, he then proceeds to dial the desired number of the called subscriber, and thereby the conventional automatic panel system in the telephone central exchange makes connection with the called subscriber.

Operation in the mobile station is on a press-to-talk basis, and the termination equipment provides means to maintain the connection during normal periods that the mobile unit is off the air during a conversation. At the end of a call, when the mobile station is off the air for a period exceeding a certain adjustable predetermined time interval, the connection is automatically disconnected and the equipment is returned to normal.

The mobile two-way radio transmitter and receiver and the fixed station two-way radio transmitter and receiver are conventional types of equipment. The present invention particularly resides in the termination equipment by which the fixed station transmitter and receiver are coupled to the telephone exchange and in the combination of this termination equipment with the rest of the system, to produce the automatic non-attended dial operation of the system.

Special means are provided according to the present invention to prevent improper dialing by central exchange subscribers from accidentally calling one of the mobile units. This is done by means of special checking selectors as is described hereinbelow.

Figure 2A:
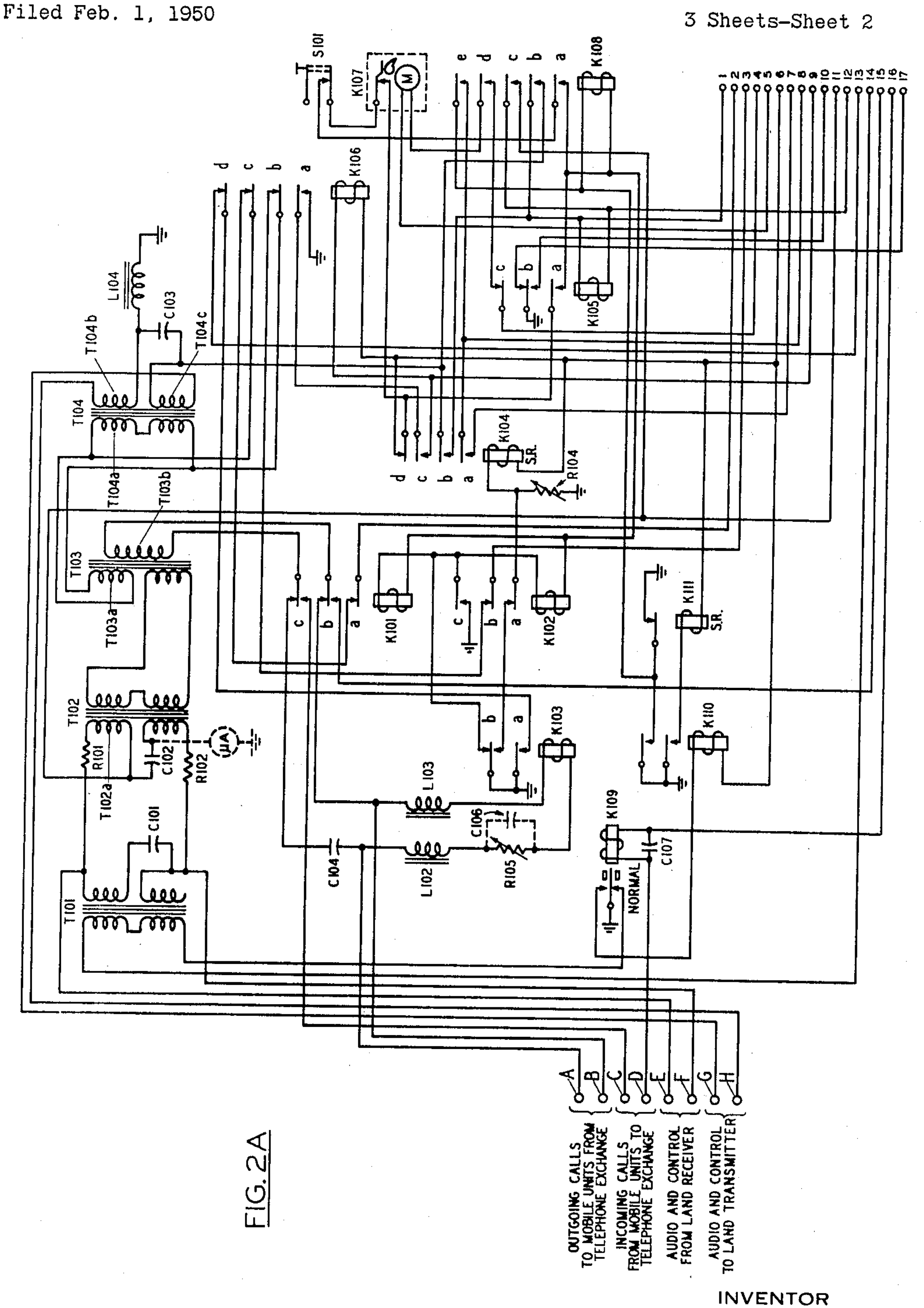
Figure 2B:
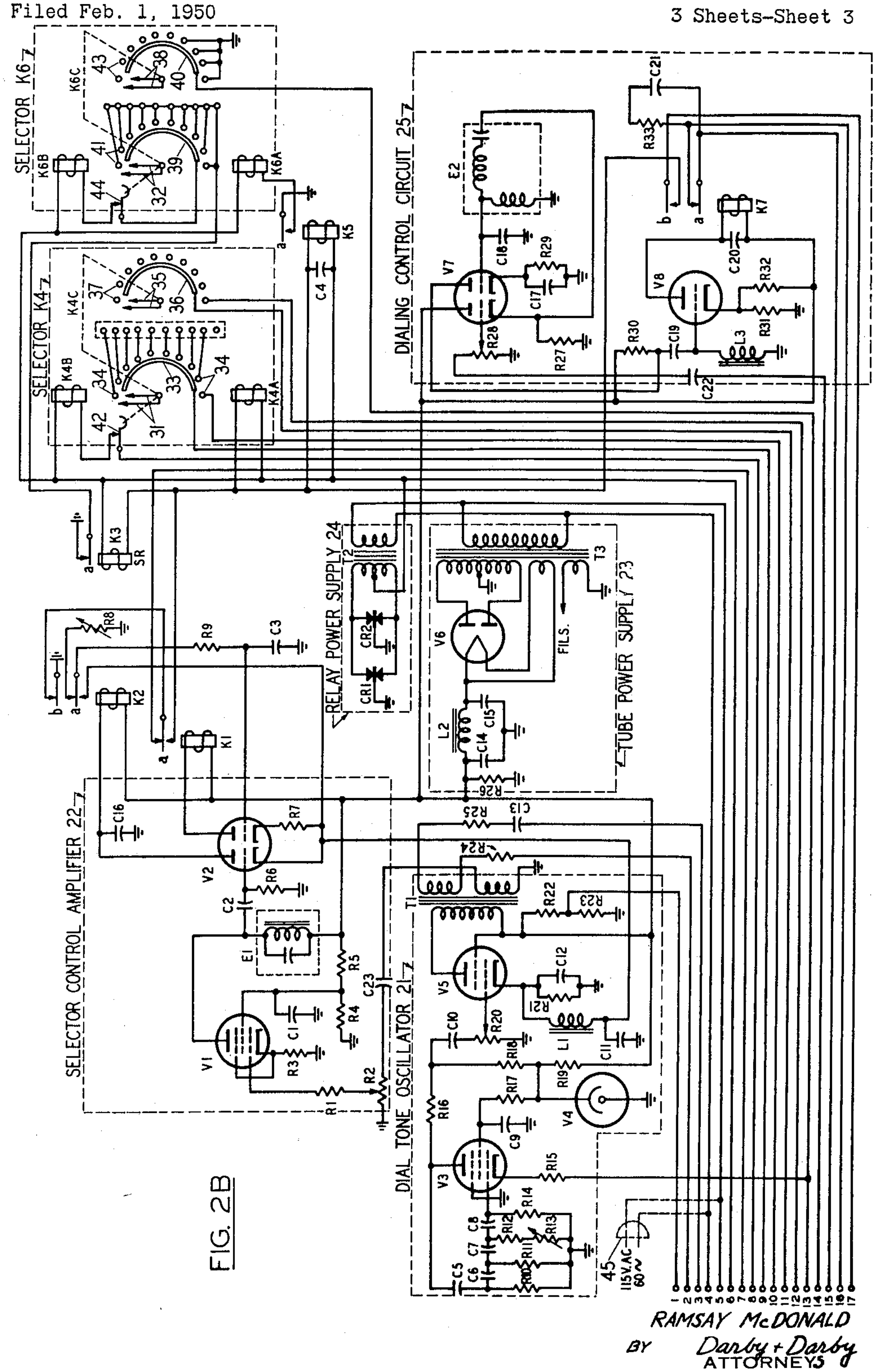

It will be understood that further objects, advantages and features of the present invention will become more readily apparent from a consideration of the following description taken in conjunction with the appended drawings, in which, Figure 1 is a schematic block diagram of the present system showing two mobile units as illustrative of the total number;

Figures 2A and 2B, taken together, are a schematic circuit diagram of the termination equipment of the present invention.

Figure 1 shows in schematic form the complete system, which comprises a set of mobile transmitter-receivers 11*a*, 11*b*, etc., each located, for example, on an automotive vehicle or ship with which it is desired to communicate from any subscriber station of the ordinary telephone system. In the following, a single mobile transmitter-receiver 11 will be referred to as representative of all. All the transmitter-receivers 11 are adapted to receive communications from and transmit communications to a single fixed transmitter-receiver 12 which, in turn, is coupled to the telephone termination equipment illustrated by rectangle 13 and shown in detail in Figures 2A and 2B. This telephone termination equipment 13 is also linked to the conventional telephone system central exchange indicated by the rectangle 14, to which it is connected by the two pairs 15, 16 of conventional telephone wires which are respectively for calls to and from the mobile station.

The system is so arranged, as will be described, that any subscriber coupled to the telephone system central exchange 14 may call any of the mobile stations merely by dialing a code number followed by the individual number of the mobile station being called.

The telephone termination equipment shown in block 13 of Figure 1 is shown in detail in Figures 2A and 2B. In general, this equipment is designed to link a conventional telephone system central exchange with a conventional mobile-to-fixed two-way radio telephone communication system, such as that sold by Link Radio Corporation under the designations transmitter-receiver Model 2210–MS or 20–FMTR–7CS plus mobile selector unit type 1779 and mobile tone oscillator and dialing assembly type 1939, for the mobile station, and transmitter-receiver type 1907 Ed. 2, 2190 or 1908 for the fixed station. The purpose of this termination equipment is to make it possible for any mobile subscriber to call automatically, and solely by dialing, any subscriber coupled to the telephone system central exchange and vice versa.

The portion of the termination equipment shown in Figure 2A consists essentially of a group of devices K101 to K111 and their circuits. The portion of the termination equipment in Figure 2B consists of a dial tone oscillator 21, a selector control amplifier 22, a tube power supply 23, a relay energizing power supply 24, a dialing control circuit 25, a pair of selectors K4 and K6, and suitable interconnecting apparatus for these elements. The circuit of Figure 2B is connected to that of Figure 2A by terminals 1 through 17, it being understood that like numbered terminals in Figures 2A and 2B are directly connected.

The termination equipment is supplied with eight terminals A to H inclusive. As shown in Figure 1, terminals A and B are coupled to one pair of wires 15 connecting the termination equipment to the central exchange and intended to transmit messages from the central exchange to the mobile station. Terminals C and D are connected to a second pair of wires 16 coupling the termination equipment to the central exchange and intended to transmit messages from the mobile station to the central exchange. Terminals E and F are connected to a pair of wires 17 coupling the termination equipment to the fixed radio receiver and serve to transfer control signals and voice signals from the radio receiver through the termination equipment to the terminals C and D and thence to the central exchange. Terminals G and H are connected to a further pair of wires 18 coupling the termination equipment to the fixed radio transmitter and serve to supply control signals and voice signals to the fixed transmitter for transmission to the mobile station.

The termination equipment will best be understood, it is believed, by tracing calls through it under several conditions, such as a call originating from a central exchange subscriber and either completed to a desired mobile station or uncompleted, and a call originating from a mobile station and either completed to a central exchange subscriber or uncompleted. It will be understood in the following discussion that in the appended drawing each relay or switch is shown in its normal or standby condition, that is, with no exciting current supplied to the relay coil. The supply of excitation to any relay coil will move the movable relay contacts toward the relay core and will thereby interrupt circuits or make circuits as the case may be.

Considering first a call from a central exchange subscriber, a code designation consisting tof two desired digits which may, for example, be two digits which would ordinarily not be used when one central exchange subscriber calls another, is allocated for the purpose of calling the termination equipment and thereby the entire group of mobile stations served by the termination equipment. For example, the code number 95 might be so used.

The convention circuits and apparatus in the central exchange are so arranged in well known manner that upon any one of the central exchange subscribers dialing 95, that subscriber is connected automatically to the terminals AB of Figure 2A. In accordance with conventional telephone system practice, thereupon a direct voltage is impressed upon wires 15 and terminals A and B from the central exchange battery. This direct current passes through inductance L102, resistance R105, the coil of relay K103 and inductance L103, whereby relay K103 is energized. Inductances L102, L103 prevent voice signals from affecting relay K103; these could be eliminated if the inductance of relay K103 is sufficiently high to gain the same effect. Resistor R105 regulates the current to relay K103 for proper pulsing. Condenser C106 is optional to improve pulsing also.

When this is done, contacts K103*b* close a circuit which passes direct current from the relay energizing power supply 24 of Figure 2B through terminal 6, the coil of relay K104, the normally closed contacts K102*a,* and now closed contacts K103*b* to ground, thereby energizing slow-release relay K104. Resistor R104 connected to relay K104 serves to adjust the release time within narrow limits.

At the same time, contacts K103*a* close to impress ground through the now closed contacts K103*a,* normally closed contacts K106*d,* terminal 13, and resistor R15 to the cathode of tone oscillator tube V3. This permits the tone oscillator 21 to begin operating, and its tone signal output derived from transformer T1 is supplied through resistors R24 and R25 and blocking condenser C13 to the terminals 2 and 3 and thereby through the normally closed contacts K102*b* and K101*a,* and through the normally closed contacts K106*c* and K106*b* to the input winding T103*a* of transformer T103, whose output winding T103*b* is coupled through normally closed contacts K101*b* and K101*c* and direct-current-blocking condenser C104 to the terminals A and B to place radio dial tone on the incoming line 15. This is known as revertive dial tone and is heard by the calling subscriber. At the same time this radio dial tone is impressed on the primary T104*a* of the transformer T104 whose secondary T104*b* is coupled to terminals G and H, whereby radio dial tone is supplied to the fixed radio transmitter 12.

The radio dial tone produced by the tone oscillator 21 is supplied by the second secondary winding T1*b* of transformer T1 through coupling condenser C23 and gain-adjusting potentiometer R2 to selector control amplifier tube V1 having a band-pass filter E1 in the plate circuit thereof, which filter is tuned approximately to the frequency of the radio dial tone. The output of tube V1 is connected through coupling condenser C2 and grid resistor R6 to the input of the first or left section of a double triode tube V2. The left cathode of tube V2 derives its bias by connection to the cathode of tone oscillator tube V5, through radio tone blocking filter L1, C11. A relay K2 is in the output circuit of the left section of V2.

This left section of V2 is biased so as to be normally cut off in the absence of tone signal and to conduct during the occurrence of tone signal, which thereby energizes relay K2. Thus, during the generation of radio dial tone by tone oscillator 21, relay K2 is energized, which closes its lower contacts K2*a*. This removes cutoff bias from the right section of V2 and provides a charging circuit for condenser C3 from the cathode of tone oscillator output tube V5 by way of resistor R9 so that condenser C3 is charged to a potential which permits the right section of tube V2 to conduct, whereby the relay K1 in its output circuit is also energized closing its lower contacts K1*a*. Thus, upon energization of relay K103, starting the radio dial tone oscillator 21, both relays K1 and K2 are energized, in addition to the energization of relay K104, described above.

The energization of relay K104 performs the following functions. First, by means of the closing of its contacts K104*a,* a ground circuit is prepared for reset solenoid K4B through contacts K2*b* (when closed by deenergization of K2), upper contacts K1*a* (when K1 is deenergized), terminal 7, contacts K104*a,* terminal 8 and off-normal switch 42 (closed only when selector K4 is off its normal position) for the purpose described below. In this way, relays K1 and K2 are adapted to control the resetting of selector K4 whenever the selector is off its normal or "home" position.

The closing of contacts *b* of K104 connects a direct voltage, such as of the order of 90 volts, derived from the junction of resistors R22 and R23 of the tone oscillator 21, by way of terminal 1, now closed contacts K104*b,* the secondary T104*c* of transformer T104 and terminal G to the fixed transmitter, a return being provided from terminal H through winding T104*b* of transformer T104 and choke coil L104 to ground. In a manner which is conventional (but not illustrated) this direct voltage actuates a relay at the fixed transmitter which energizes all the transmitter circuits, the transmitter being otherwise normally deenergized. In this way relay K104 turns on the fixed transmitter to radiate dial tone to all the mobile stations.

The energization of relay K104 also closes its contacts *c* which prepares a ground circuit through contacts K106*a* (when energized) and contacts K104*c* to the winding of relay K106, so that a holding circuit is prepared to become effective to retain relay K106 energized after it has become once energized.

The energization of relay K104 also opens its contacts $d$ which disables relay K108 by disconnecting its winding from the source of power (terminal 6 and power supply 24) and thereby prevents relay K108 from operating.

At this stage the calling subscriber hears the revertive radio dial tone; the radio transmitter is operating; dial tone is applied to the transmitter audio input and is being radiated to all mobile stations. The calling subscriber then dials a 4-digit number assigned to the particular mobile station being called. In this system each mobile station operating in the system is assigned a 4-digit number, these digits being so selected that the sum of all four is 10. For example, the digits may be 1117, 1234 or the like. There may be up to 84 such mobile stations, each with an individual number, operating on the same dial tone. It will be apparent that no one digit in this system can exceed 7 (the digit 0 is considered 10 in this system as is conventional).

The operation of the telephone dial by the calling subscriber serves to interrupt the direct current supplied to relay K103 over terminals AB a number of times corresponding to each digit being dialed. Each such interruption of the current through relay K103 deenergizes it, and causes its contacts $a$ and $b$ to assume their deenergized positions. In so doing, during each deenergized interval of relay K103 the cathode circuit of tube V3 of the dial tone oscillator 21 is disconnected from ground, which interrupts the generation of dial tone. Relay K104, being slow-release, does not drop out during these short interruptions of energization of relay K103. Hence, the transmitter continues operating and the radio dial tone transmitted thereby is keyed in correspondence with the digits dialed by the calling subscriber.

Each time the tone oscillator 21 is thus interrupted, tube V1 and the left section of tube V2 of the selector control amplifier 22 become cut off, and relay K2 drops out, which closes its contacts $b$ and upper contacts $a$ to connect resistors R8 and R9 in series across condenser C3. Condenser C3 has a fairly long time constant of discharge through resistors R9 and R8 so that during the rapid pulses derived by the dialing of any single digit the second or right section of tube V2 remains conducting to retain relay K1 energized. This holding action for the right section of V2 is controlled by the adjustment of R8.

Also provided are a pair of selectors K4 and K6, which are conventional 10 contact stepping switches such as manufactured by Clare Manufacturing Company. Referring to selector K4, it has a motor coil K4A, whose actuation, as by a pulse of current, serves to step an arm 31 to the next position. Arm 31 makes contact between a sector 33 and a series of 10 contacts 34. A second arm 35 is ganged with arm 31, and similarly cooperates with a sector 36 and contact 37. A reset magnet coil K4B is provided, whose actuation restores the ganged arms 31, 35 to the zero or "home" position, where these arms operate a limit switch 42 which opens the reset magnet coil circuit.

At the telephone termination equipment shown in Figures 2A and 2B, selector K4 uses only the tenth position contact 34 of its front bank, all other contacts 34 being open circuited. At the rear bank also, only the tenth position contact 37 is in the circuit, all others being unused.

Selector K6 similarly has a motor or stepping magnet coil K6A, a reset magnet coil K6B, ganged arms 32, 38, front and rear bank sectors 39, 40, front and rear bank contacts 41, 43, and an off-normal switch 44. In this case, all the front bank contacts 41 are connected together, and the last four second bank contacts 43 are grounded, the first six being unused.

As the first pulse is dialed, relay K2 becomes deenergized due to dropping out of relay K103 and the consequent cessation of dial tone. Contacts K2$b$ apply ground through still closed lower contacts K1$a$ to the slow release checking relay K3 which is energized and thereby opens its contacts $a$ and disconnects ground from the reset magnet coil K6B of selector K6 whereby K6B is open circuited, and is prevented from resetting selector K6. At the same time, ground is applied via K2$b$ and K1$a$ to the motor or stepping magnet K4A of the selector K4, whereby its movable arms 31, 35 are stepped once.

At the same time, the closing of contacts K2$b$ applies ground to the winding of relay K5 which becomes energized to close its contacts K5$a$, which apply ground to the stepping magnet K6A of selector K6 to move its arms 32, 38 to the first position. As the selector arms move away from their "home" or zero positions, the switches 42 and 44 also close to condition the reset magnet K4B and K6B for operation under control of relay K1. At the cessation of the first dial pulse, dial tone resumes and relay K2 is again energized, so that the charge on condenser C3 is restored via lower contacts K2$a$, and relay K1 remains energized for the subsequent pulse. Relay K3, being a slow release relay, also keeps its contacts K3$a$ open until the next pulse.

The next dial pulses operate similarly, and the selector arms are thereby stepped around through a number of steps corresponding to the number of pulses contained in the first digit dialed. For example, if digit 6 is dialed, arms 31, 35, 32, 38 will step around to the sixth position.

Upon cessation of the last pulse of the first digit, dial tone is restored until the next digit is dialed. Therefore, relay K2 remains energized, disconnecting ground from relay K3, which drops out after a brief interval, selected to be shorter than the normal interval between dialed digits. Reset magnet K6B of selector K6 is then grounded through now closed contacts K3$a$, the front (left) bank of selector K6, and switch 44, and thus restores selector K6 to the "home" position.

The next digit dialed steps selector K4 for an additional number of steps corresponding to that digit. Selector K6 also steps over a number of steps corresponding to this second digit, but at the end of the second digit K6 is restored again to its "home" position in the manner just described. This is repeated for all four digits of the called mobile station number. Since the four digits total 10, the selector K4 is thereby stepped to its 10th position whereby the arms 31 connect the sector 33 to the last contact 34 to make circuit therebetween.

However, the selector K6 has returned to the "home" position after each digit and remains there. Selector K6 serves to help prevent operation of the system by a great many ordinary numbers of central station subscribers which may accidentally be dialed. Thus, if the call number of the radio telephone termination equipment (illustrated here as "95") is accidentally dialed, and if any one digit dialed thereafter is greater than 7 (as is very likely the case), selector K6 steps to its seventh, eighth, ninth or tenth position. At each of these positions, a steady ground is thereby impressed on the cathode of the oscillator tube V3, via contacts 43 and sector 40, to maintain continuous dial tone and to prevent the relay K103 through its contact $b$ from in any way interrupting dial tone. Therefore, no digit larger than 7 can be transmitted to the mobile station and the system is rendered insensitive to a great many wrong numbers.

At this stage of the call, after the four digits are dialed, the following conditions exist. The calling subscriber has completed dialing and is waiting for the called unit to answer. Relays K103 and K104 are operated. Selector K4 is waiting at its tenth level. Selector K6 is at the "home" position. The fixed transmitter is radiating and steady radio dial tone is being transmitted to the mobile units. At the called mobile unit, this sequence of digits has actuated a selector similar to K4 or K6 to its tenth level, ringing a bell or giving another signal.

When the called mobile unit answers it radiates a carrier which is received at the fixed receiver to actuate a carrier-operated relay impressing a ground on terminal E. This ground is connected through the primary T102*a* of transformer T102, terminal 11, sector 36, contact 37 at the tenth level on selector K4, to terminal 12, to the winding of relay K105 which is thereby energized. Relay K105 thus remains operated so long as the mobile transmitter is radiating.

When relay K105 operates, its contacts K105*a* close to condition relay K108 to be operated from power supply 24 (when relay K104 falls out), through terminal 6, contacts K104*d* (when closed), now closed contacts K105*a*, to the winding of relay K108 and thence through either contacts K111*a* or K110*a* to ground.

Lower contacts K105*b* close to place ground through terminal 10, selector contact 34, arm 31 (in tenth position), sector 33 and terminal 9, to the winding of relay K106 and thence to terminal 6 and the power supply 24. Relay K106 is thereby operated, and the contacts K106*a* retain relay K106 operated so long as relay K104 is operated. Contact K105*c* disconnects the alternating current source 45 from the time-operated switch K107 to be described.

The operation of relay K106 opens its contacts *b* and *c* which removes radio dial tone from the input T104*c* of transformer T104 and thereby cuts off radio dial tone from the fixed radio transmitter terminals GH. Also, energization of relay K106 opens its contacts *d* which disconnects ground from the cathode of the tone oscillator tube V3 (via terminal 13) and thereby entirely cuts off the tone oscillator. When the tone oscillator is cut off by the operation of relay K106, relay K2 is deenergized, as is relay K1 after a short time delay, so that ground is applied through contacts K2*b*, K1*a*, terminal 7, contacts K104*a*, terminal 8, and the selector off-normal switch 42 to the reset magnet K4B, which thereby resets selector K4 to the normal or "home" position. The circuit is now complete for conversation and the subscribers can talk back and forth.

When the calling subscriber hangs up at the conclusion of the call, direct current is cut off from relay K103 which drops out. This deenergizes relay K104, by virtue of the opening of contacts K103, and relay K104 then drops out after its normal time delay. Contacts K104*c* then open to cut off the holding circuit for relay K106, which also drops out. Contacts K104*b* also open to turn off the fixed transmitter. The equipment is then ready for the next call.

In a situation where the called mobile unit fails to answer, the same steps occur except that relay K105 is not operated because no carrier is received. When the calling subscriber receives no answer from the mobile unit, he merely hangs up. In so doing, relay K103 is deenergized by the removal of direct current from the lines A and B. This causes relay K104 to become deenergized by the opening of contacts K103*b*. However, before relay K104, which is a slow release relay, can drop out, relay K1 has become deenergized whereby ground is applied through contacts K2*b* and K1*a*, terminal 7, contacts K104*a*, terminal 8 and switch 42 to the selector reset magnet K4B which thereby operates to restore selector K4 to the "home" position. Thereafter, relay K104 drops out and the fixed station transmitter is turned off and the equipment is in readiness for the next call.

In initiating a call from a mobile unit, the mobile calling subscriber determines that the radio channel is clear by listening in the earpiece of his hand set. Reception of a loud rushing noise, which is essentially an indication that no transmission is on the air, is the indication that the channel is clear for his call. The calling subscriber then dials 0 on his telephone hand set which produces ten pulses of radiated dial tone from the mobile tone oscillator. The reception of the radio carrier from the mobile station by the fixed receiver operates the carrier-operated relay at the fixed receiver to place a ground on terminal E. This ground is fed through the primary T102*a* of transformer T102 and terminal 11 to the sector 36 and rear bank contact 37 of selector K4. The ten dial tone pulses from the mobile unit pass via transformer T101 through terminal 14 to the input of the tone selector amplifier V7, which is a two-stage cathode-coupled amplifier including a filter E2 tuned to the mobile station tone frequency. The output of amplifier tube V7 is supplied through a coupling condenser C19 to the input of tube V8 which has a relay K7 in its anode circuit. The cathode of tube V8 is supplied with proper bias by voltage divider resistors R31 and R32 fed from power supply 23.

In this way, each pulse of dial tone causes relay K7 to be operated, and the relay K7 is thereby operated ten times. Each operation of relay K7 impresses a ground through closed upper contacts K105*b*, terminal 17, and closed contacts K7*b* to the relay K5, and also to relay K3 and the selector motor magnet K4A, all of which are operated ten times correspondingly.

The operation of relay K3 opens its contacts K3*a*, which remains open during the entire ten dial pulses, since K3 is a slow release relay. The operation of relay K5 actuates selector motor magnet K6A ten times, and steps movable arms 32, 38 to the tenth position. However, after the tenth dial pulse, relay K3 falls out, placing ground through now closed contacts K3*a*, contact 41, sector 39, and off-normal switch 44, to reset magnet K6B, which thereupon resets selector K6 to its "home" position.

The operation of selector motor magnet K4A ten times in response to the dialed 0 from the mobile station advances its arms to the tenth position. When selector K4 reaches its tenth position it completes a circuit from the grounded terminal E through the primary T102*a* of transformer T102, terminal 11, sector 36, tenth level rear bank contact 37, and terminal 12 to the winding of relay K105 which is thereby energized to close its contacts *a* and *b* and to open its contact *c*.

The closing of contacts K105*a* while selector K4 is at the tenth level completes a circuit from ground through contacts K103*b* when unenergized, the windings of relays K101 and K102, now closed contacts K105*a*, normally closed contacts K104*d*, to terminal 6 and the relay energizing power supply 24 whereby relays K101 and K102 are operated. It will be noted that this energization of relays K101 and K102 is effected only while relay K103 remains unenergized. It will be remembered that relay K103 is operated in response to initiation of a call from a fixed station subscriber. So long as relay K103 is unoperated, no call from the fixed station subscriber is in progress and the channel is clear for a call from the mobile station.

In addition to energizing relays K101 and K102 the closing of contacts K105*a* impresses direct voltage from the relay energizing power supply 24 through terminal 6, normally closed contacts K104*d*, now closed contacts K105*a*, to the winding of relay K108, whose other terminal is grounded through relay contacts K111*a* when unenergized (or contacts K110*b* when energized), whereby relay K108 is also energized.

The opening of contacts K105*c* disconnects the alternating current source 45 from the time-operated switch K107 even though relay K108 is energized.

Relay K108 through its closed contacts *a*, manual reset switch S101, time switch K107 and normally closed contacts K104*d* provides a holding circuit to retain itself energized until S101 or K107 opens circuit.

The closing of contacts K108*b* impresses direct voltage derived from the voltage divider R22, R23 of the tone oscillator and terminal 1 through now closed contacts K108*b*, through the secondary T104*c* of transformer T104, to terminal G, by which the fixed transmitter is energized as described previously.

The closing of contacts K108c provides a bypass across terminals 11 and 12, independent from tenth level selector contact 37 and sector 36, whereby relay K105 remains energized in response to reception by the fixed receiver from the mobile transmitter despite return of selector K4c to "home" position.

The closing of contacts K108d connects the alternating current source 45 through terminal 4, contacts K105c (when closed), contacts K108d, to the motor of timer switch K107 and back to terminal 5, so that the time switch K107 becomes energized whenever relay K105 becomes deenergized.

The closing of contacts K108e connects ground through normally closed contacts K111a (or K110b, if closed), contact K108e, and terminal 8, to the reset magnet K4B for selector K4, whereby selector K4 is restored to its "home" position. It will be seen that the connection formerly made by the second bank of selector K4 in its tenth position is now replaced by the closing of contacts K108c.

In this way relay K108 remains energized so long as timer switch K107 remains closed. In turn timer switch K107 commences operation only upon deenergization of relay K105 which, in turn, is responsive to the cessation of reception of carrier by the fixed receiver.

Timer switch K107 is of conventional type which opens its contacts after a predetermined and preferably adjustable interval following initiation of its energization. As will be described below, its purpose is to restore the system to normal call-receiving condition after the calling mobile subscriber hangs up. It may be set for any interval between 2 to 60 seconds, preferably being adjusted to a 30 second interval.

When relay K101 operates in response to relay K105, it opens its contacts *a* and its upper contacts *b* and *c* while closing lower contacts *b* and *c*. The opening of contacts K101a disconnects the radio dial tone oscillator from the transformer T104. The closing of lower contacts K101b and K101c connects the winding T103b of transformer T103 to terminals C and D through terminal 15, now closed contacts K7a, terminal 16, the winding of relay K109 and so to terminal D. It will be understood that condenser C108 bypasses relay K109 with respect to any voice or dial tone currents, so that relay K109 does not respond to voice or tone oscillator currents.

Relay K102, upon energization, opens its contacts K102a and K102b and closes contacts K102c. The opening of contacts K102a opens the energizing circuit for relay K104, which is thereby completely disabled and rendered unresponsive to relay K103 should an attempted call from a fixed station subscriber occur.

The opening of contacts K102b interrupts the output circuit from the dial tone oscillator 21 and disconnects it from the fixed station transmitter audio input terminals G and H. The closing of contacts K102c places ground on relay K102 and relay K101 so as to lock these two relays in energized condition.

In this way, the telephone pair terminals C and D are directly connected to winding T103b of transformer T103. This complete loop seizes the line to the telephone central exchange, and the central exchange dial tone is then fed back on this line and is transmitted through transformer T103 and transformer T104 to terminals G and H, whereby this central exchange dial tone is transmitted by the fixed radio transmitter back to the calling mobile subscriber.

When the mobile subscriber hears this central exchange dial tone, he then dials the digits of the called number in the central exchange. These trains of radio dial tone pulses appearing on terminals E and F are transmitted through transformer T101, to the dialing control circuit tubes V7 and V8, to correspondingly actuate the relay K7 and open its contacts K7a in correspondence with the incoming dialed pulses. The operation of relay K7 thereby correspondingly interrupts the direct current path between terminals C and D, so that the pulses dialed at the mobile station effectively pass to the central exchange as interruptions in the telephone line current. This causes the central exchange equipment to select and ring the desired called number. Revertive telephone company ringing can be heard by the mobile subscriber by way of terminals C and D, transformer T103, transformer T104, terminals G and H and the fixed radio transmitter.

Since the calling mobile subscriber is on the air only during dialing, relay K105 drops out as soon as dialing ceases, thereby starting timer switch K107. The normal period of 30 seconds for timer switch K107 permits about four rings to go through to the called subscriber. If the calling mobile subscriber desires to have ringing continued for a longer period than that determined by K107, he must return the carrier to the air momentarily (by pressing his press-to-talk button), thereby resetting K107.

When the called subscriber answers, line current is reversed in polarity which causes the polarized relay K109 to operate, placing ground on its upper contact which thereby energizes relay K110 to close its contacts K110a and K110b. The closing of contacts K110a energizes relay K111 which is of the slow-release type. At the same time the ground return to the input of tube V7 of the dialing control circuit unit is interrupted by the opening of the lower contacts of K109 to prevent further interruptions of line current due to possible speech operation of the dialing control unit. Relay K110, by operating relay K111, transfers the ground connection from the slow release relay K111 to the quick release relay K110.

The circuit is now set up for conversation with relays K101, K102, K105 and K108 operated. Relays K104 and K106 are disabled and cannot be operated by a call originating at a fixed subscriber. Each time the mobile radio carrier leaves the air, either because the mobile station is listening or because the mobile station has hung up, relay K105 drops out, which closes its contacts K105c and energizes the motor circuit of timer switch K107. If the mobile radio carrier does not return to the air within the time to which timer switch K107 is adjusted, K107 breaks the holding circuit for relay K108 thereby deenergizing relay K108. However, if the mobile carrier does return to the air within the time set, relay K105 operates once more and opens the motor circuit of timer switch K107. This causes timer switch K107 to reset to its starting position and it restarts its timing cycle the next time relay K105 is released in response to the mobile carrier leaving the air.

This timing period is eliminated when the called central exchange subscriber hangs up. This reverses line current, again restoring K109 to normal, which, in turn, releases relay K110 to remove the ground return from relay K108 by opening contacts K110b. Contacts K108c thus open, to deenergize relay K105 and open its contacts K105a. Contacts K108a open and, since contacts K105a have already opened, the energizing circuit for relay K108 remains open preventing further operation of K108.

The dropping out of relay K110 also opens its contacts K110a, which interrupts the circuit for relay K111. However, relay K111 is a slow-release relay, and does not drop out until after relay K108. Hence the later closing of contacts K111a does not prevent relay K108 from dropping out.

When relay K108 drops out, the motor circuit of timer switch K107 is interrupted by the opening of contacts K108d, and relays K101 and K102 are deenergized by the opening of contacts K108b, whereby the equipment is returned to normal.

In telephone exchanges which do not use reverse line current, relays K109, K110 and K111 are eliminated and the ground return of relay K108 is permanently connected to ground. In this case, all calls for mobile units are disconnected by timer switch K107 after the preset time has elapsed.

If the called subscriber does not answer in response to a call initiated from the mobile station, the calling subscriber merely hangs up, whereby timer switch K107, after its preset time, opens the circuit for relay K108, restoring the system back to normal as described above.

The above system has been described as using a single dial tone for all mobile stations. With such a single dial tone in this type of system up to 84 mobile subscribers can be accommodated. However, this is not the limit of the system, since by use of more than one dial tone (i. e., different tone frequencies), further sets of 84 mobile subscribers can be served, each set responding only to a single dial tone.

While the above system has been described as providing communication with a plurality of mobile subscribers, it will be understood that these subscribers may equally well be momentarily or permanently stationary without affecting the utility or operation of the system.

While the above system has been described in detail, being a preferred embodiment of the invention, it is to be understood that this description is illustrative only of the invention since many apparently widely differing modifications and variations thereof can readily be devised by persons skilled in this art without departing from the spirit or scope of the invention which is defined merely by the appended claims.

What is claimed is:

1. An automatic radio-telephone system adapted to provide fully dial-operated two-way communication between any subscriber coupled to a telephone central exchange and a plurality of further subscriber stations, each of said stations being designated by a code number comprising a termination equipment coupled to said exchange by a wire pair; a master radio apparatus, including a normally off transmitter and a normally on receiver coupled to said termination equipment; each of said subscriber stations comprising a subscriber radio apparatus, including a normally off transmitter and a normally on receiver adapted to communicate respectively with said master receiver and transmitter; said termination equipment comprising a radio dial tone generator, means responsive to reception from said wire pair of impulses representing the called number of said system for turning on said master transmitter, for conditioning said tone generator to produce radio dial tone, and for supplying said radio dial tone to said master transmitter for radiation thereby to all said subscriber station receivers, means thereafter responsive to reception from said wire pair of impulses representing the called number of one of said subscriber stations for correspondingly interrupting said radiated radio dial tone, means responsive to reception by said master receiver of a carrier radiated by said called subscriber transmitter for blocking said tone generator, and means for coupling the input of said master transmitter and the output of said master receiver to said wire pair, whereby two-way communication between said wire pair and said subscriber station is effected.

2. An automatic radio-telephone system as in claim 1, wherein the code number of each subscriber station has the same plurality of non-zero digits totalling a fixed predetermined sum; said system further comprising means responsive to reception by said termination equipment of a consecutive train of impulses from said wire pair exceeding the difference between said fixed sum and the number of digits in said plurality for rendering said tone generator unresponsive to further impulses from said wire pair.

3. An automatic radio-telephone system as in claim 2, wherein said last named means comprises a stepping selector switch, means for stepping said switch from a home position through a number of positions corresponding to the number of impulses of each digit received by said termination equipment from said wire pair, means responsive to reception by said equipment from said pair of a number of impulses less than said difference for returning said stepping selector to its home position after the termination of the impulses representing such digit, and means responsive to stepping of said selector through a number of positions greater than said difference for continuously energizing said tone generator.

4. An automatic radio-telephone system adapted to provide fully dial-operated two-way communication between any of a plurality of first radio subscriber stations and any of a plurality of second subscriber stations connected to a conventional telephone central exchange, comprising a termination equipment coupled to said exchange by a wire pair, a master radio apparatus including a normally off transmitter and a normally on receiver, each of said first radio subscriber stations comprising a subscriber radio apparatus including a normally off transmitter and a normally on receiver, all said transmitters and receivers being adapted to communicate respectively with said master receiver and transmitter; said termination equipment comprising means responsive to reception by said master receiver of a sequence of carrier wave impulses radiated by a radio subscriber transmitter representing the number of said termination equipment for energizing said master transmitter and for seizing said wire pair by completing a direct current path between the wires of said pair, means thereafter responsive to reception by said master receiver of a sequence of carrier impulses representing the called number of one of said second subscribers for whom a call is intended for transmitting a corresponding sequence of impulses over said wire pair to said exchange to cause the central office equipment at said exchange to select and ring the called number of said one second subscriber, and means automatically responsive to answering by said one second subscriber for coupling said wire pair to said master transmitter and said master receiver to effect two-way communication between said first and second subscribers.

5. An automatic radio telephone system as in claim 4, wherein said termination equipment further comprises means for transmitting telephone exchange revertive ringing appearing on said wire pair to said master transmitter input for transmission to said subscriber receiver.

6. An automatic radio telephone system as in claim 5, further including means responsive to reception by said master receiver of said first-named sequence of carrier wave pulses for initiating the generation of radio dial tone and for supplying said radio dial tone to the input of said master transmitter for transmission to said subscriber receiver.

7. An automatic radio-telephone system as in claim 6, further including means responsive to cessation of transmission from said subscriber transmitter for an interval greater than a predetermined period of time for deenergizing said master transmitter and disconnecting said wire pair from said master transmitter and receiver.

8. An automatic radio telephone system as in claim 7, further comprising means responsive to hanging up by said called subscriber for deenergizing said master transmitter and disconnecting said wire pair from said master transmitter and receiver.

9. An automatic radio telephone system for providing two-way communication between two stations, comprising a first radio apparatus including a normally energized receiver and a normally deenergized transmitter, a second radio apparatus comprising a normally energized receiver and a normally deenergized press-to-talk transmitter, each adapted when energized to communicate respectively with said first transmitter and receiver when energized, means for energizing said first transmitter and coupling a subscriber station to each of said first and second radio apparatus for two-way communication therebetween, and means responsive to cessation of transmission from said second transmitter for longer than a predetermined interval for disconnecting said coupling means and deenergizing said first transmitter.

10. An automatic radio telephone system as in claim 9, wherein said energizing and coupling means is automatically responsive to impulses created at either of said subscriber stations, and said disconnecting and deenergizing means comprises a motor-driven timer switch and a relay adapted to be deenergized upon actuation of said switch to provide said disconnecting and deenergizing.

11. In an automatic radio-telephone system adapted to provide fully dial-operated two-way communication between any of a plurality of first subscriber stations coupled to a conventional telephone central exchange and any of a plurality of second radio subscriber stations comprising a termination equipment coupled to said exchange by first and second wire pairs, a master radio apparatus including a normally deenergized transmitter and a normally energized receiver coupled to said termination equipment, each of said second radio subscriber stations comprising a subscriber radio apparatus including a normally deenergized press-to-talk transmitter and a normally energized receiver adapted to communicate respectively with said master receiver and transmitter, said termination equipment comprising a radio dial tone generator, means responsive to reception by said equipment from said first wire pair of impulses representing the called number of said equipment for energizing said master transmitter for conditioning said tone generator to produce radio dial tone, and for supplying said radio dial tone to the modulation input of said master transmitter for radiation thereby to said subscriber receivers, means thereafter responsive to reception by said equipment from said first wire pair of impulses representing the called number of one of said radio subscriber stations for correspondingly interrupting said radiating dial tone, means responsive to reception by said master receiver of a carrier radiated by said called subscriber transmitter for blocking said tone generator and for coupling the input of said master transmitter and the output of said master receiver to said first wire pair, said termination equipment further comprising means responsive to reception by said master receiver of a sequence of carrier wave impulses representing a called number of said termination equipment for energizing said master transmitter and for seizing said second wire pair by completing a direct current path between the wires thereof, means thereafter responsive to reception by said master receiver of a sequence of carrier impulses representing the called number of one of said exchange subscribers for whom a call is intended for transmitting a corresponding sequence of impulses for said second wire pair to said exchange, and means automatically responsive to answering by said exchange subscriber for coupling said wire pair to said master transmitter input and said master receiver output to effect two-way communication between said exchange subscriber and said radio subscriber station.

12. In a mobile radio telephone system, a radio control station, mobile stations, means for transmitting a mobile radio frequency carrier by a calling one of said mobile stations and for initiating a call thereby, means in said control station operated responsive to the receipt of said call for transmitting a control station radio frequency carrier, means for maintaining said control station transmitting means in operating condition to maintain said control station carrier on the air during transmission of said mobile radio frequency carrier, and means in said control station operated at a predetermined time interval after cessation of said mobile radio frequency carrier for removing said control station carrier from the air.

13. In a mobile radio telephone system, a radio control station connected to an automatic telephone exchange having a plurality of fixed automatic subscriber stations connected thereto, a plurality of mobile stations, means in said control station responsive to the initiation of a call by one of said fixed subscriber stations to a called one of said mobile stations for seizing said radio control station, a radio transmitter in said radio control station operative in response to said seizure for placing a control station radio frequency carrier on the air, means at said control station responsive to subsequent dial pulses received from said calling fixed subscriber station for modulating said radio control station carrier in accordance with said dial pulses, means in said called mobile station operative in response to said control station modulated carrier pulses for selecting and signaling said called mobile station, and means including a hand-set and a radio transmitter at said called mobile station for completing said connection over the air between said calling fixed subscriber station and said called mobile station.

14. In a mobile radio telephone system, a radio control station connected to an automatic telephone exchange having a plurality of fixed automatic subscriber stations connected thereto, a plurality of mobile stations, means in said control station responsive to the initiation of a call by one of said fixed subscriber stations to a called one of said mobile stations for seizing said radio control station, a radio transmitter in said radio control station operative in response to said seizure for placing a control station radio frequency carrier on the air, means at said control station responsive to subsequent dial pulses received from said calling fixed subscriber station for modulating said radio control station carrier in accordance with said dial pulses, means in said called mobile station operative in responsive to said control station modulated carrier pulses for selecting and signaling said called mobile station, means including a hand-set and a radio transmitter at said called mobile station for completing said connection over the air between said calling fixed subscriber station and said called mobile station, maintaining means in said radio control station operative for maintaining said control station carrier on the air during conversation and after said called station disconnects from said connection, and means in said radio control station thereafter operative for restoring said maintaining means to remove said radio control station carrier from the air.

15. In a telephone system for extending calls over a radio link between a first group of connected subscriber stations and a second group of isolated subscriber stations in response to dial pulses initiated by the calling subscriber; a radio control station, means in said control station operated responsive to the initiation of a call by calling one of said first calling group of subscribers for seizing said control station, means in said control station operative responsive to the dialing of a call number individual to one of said second group of isolated subscribers for transmitting pulses corresponding to the digits of said number to each of said second group of isolated subscribers, means at each of said isolated subscriber stations for receiving said transmitted pulses, means at each of said isolated subscriber stations responsive to said pulses for discriminating between incoming calls to said isolated subscriber stations and for signaling the called subscriber at the station corresponding to said dialed call number, and means at said called station responsive to the severance of said call by said called subscriber for initiating the release of said control station.

16. In a mobile radio telephone system, a radio control station coupled to an automatic telephone exchange and having a radio transmitter and a radio receiver, a plurality of mobile stations each having means for transmitting a mobile station radio carrier and means for receiving a control station radio carrier, means at each of said mobile stations for initiating a call to said radio control station, means at said radio control station operated in response to receipt of said call for transmitting a control station radio carrier, means for maintaining said control station transmitting means in operating condition to maintain said control station carrier during transmission of said mobile station carrier, means also responsive to initiation of said call for causing said radio control station to seize a line to said automatic telephone exchange, means at said radio control station to transmit dial tone from said seized line to said control station transmitter for radiation to said calling mobile station, means at said control station responsive to receipt of called number dial pulses from said mobile station for transferring a version of said pulses to said seized line to call a called subscriber having said called number, and means responsive to answer by the called subscriber to interrupt said pulse-version-transferring means and for coupling said seized line directly to said control station transmitter and receiver to transmit voice signals from said line to said mobile station and to receive voice signals from said mobile station and transfer said signals to said line.

References Cited in the file of this patent

UNITED STATES PATENTS

| | | |
|---|---|---|
| 2,064,958 | Taylor et al. | Dec. 22, 1936 |
| 2,176,868 | Boswau | Oct. 24, 1939 |
| 2,457,434 | Bartelink | Dec. 28, 1948 |
| 2,478,361 | Bartelink | Aug. 9, 1949 |
| 2,523,914 | Molnar | Sept. 26, 1950 |
| 2,530,815 | Dimmer | Nov. 21, 1950 |
| 2,616,032 | Herrick | Oct. 28, 1952 |
| 2,623,164 | Herrick | Dec. 23, 1952 |